(12) United States Patent
Le Quere

(10) Patent No.: US 6,714,955 B2
(45) Date of Patent: Mar. 30, 2004

(54) HIGH SPEED RANDOM NUMBER GENERATION

(75) Inventor: Patrick Le Quere, Villebon sur Yvette (FR)

(73) Assignee: Bull, S.A., Louveciennes (FR)

(*) Notice: Subject to any disclaimer, the term of this patent is extended or adjusted under 35 U.S.C. 154(b) by 190 days.

(21) Appl. No.: 09/913,356

(22) PCT Filed: Dec. 7, 2000

(86) PCT No.: PCT/FR00/03422

§ 371 (c)(1),
(2), (4) Date: Aug. 13, 2001

(87) PCT Pub. No.: WO01/46797

PCT Pub. Date: Jun. 28, 2001

(65) Prior Publication Data

US 2003/0014452 A1 Jan. 16, 2003

(30) Foreign Application Priority Data

Dec. 21, 1999 (FR) ............................................ 99 16123

(51) Int. Cl.⁷ ................................................ G06F 1/02
(52) U.S. Cl. ..................................................... 708/250
(58) Field of Search ................................. 708/250–256

(56) References Cited

U.S. PATENT DOCUMENTS 4,641,102 A   2/1987  Coulthart et al.
5,034,906 A * 7/1991  Chang et al. ............... 708/250

FOREIGN PATENT DOCUMENTS

WO   WO 99 61978 A   12/1999

OTHER PUBLICATIONS

"Integrated Circuit Compatible Random Number Generator" IBM Technical Disclosure Bulletin, US IBM NY, vol. 30, No. 11, Apr. 1, 1988, pp. 333–335, XP000021682, ISSN: 0018–8689.

Petrie C S et al: "Modeling and Simulation of Oscillator-Based Random Number Generators" IEEE International Symposium on Circuits and Systems (ISCAS) US NY IEEE, May 12, 1996, pp. 324–327, XP00070462, ISBN: 0–7803–3074–9, p. 324–327.

* cited by examiner

Primary Examiner—Tan V. Mai
(74) Attorney, Agent, or Firm—Miles & Stockbridge P.C.; Edward J. Kondracki

(57) ABSTRACT

A high-speed random number generator (1) comprising a physical random number generator, having a data input, an output and a pseudo-random generator coupled to the output of the physical random generator. The pseudo-random generator has an input adapted to receive a germ delivered by the physical generator and deliver at an output a pseudo-random output signal. The physical generator comprises a logic circuit that includes at least a data input (D) and a clock input (CLK), the data input (D) receiving a first "high frequency" clock signal H1 and the clock input (CLK) receiving a second "low frequency" clock signal H2, with the "high frequency" signal H1 being sampled by the "low frequency" signal H2. The two clock signals H1 and H2 are of different frequencies respectively and issue from two different first (OSC1 and OSC2) operating asynchronously from one another and not adhering to the setup time of the logic circuit (10). The logic circuit is arranged to deliver at an output a signal in an intermediate state qualified as metastable between "0" and "1" and being constituted by a random number sequence. The metastability of the signal obtained as an output from the logic circuit (10) is accentuated by phase noise of the first oscillator (OSC1) generating the "high frequency" signal H1. The pseudo-random generator is arranged to re-inject part of the pseudo-random output signal into the physical generator. An internal memory stores the random numbers obtained as output signals from the pseudo-random generator. The two generators run on the same second "high frequency" clock H generated by the external oscillator (7).

32 Claims, 2 Drawing Sheets

HIGH SPEED RANDOM NUMBER GENERATION

FIELD OF THE INVENTION

The present invention is in the field of encryption, and more specifically concerns a hardware solution for the implementation of a random number generator designed especially for generating encryption keys.

DESCRIPTION OF RELATED ART

The increased need for performance in cryptography combined with the need for inviolability has led the manufacturers of security systems to favor hardware solutions that are increasingly high-performance in terms of speed and random number quality.

The generator according to the invention, also called a random generator, can be associated with an additional PCI (Peripheral Component Interconnect) card for accelerating the cryptographic functions of a machine (server or station).

A card of this type coupled with a server constitutes the hardware security element of the machine.

There are two types of random number generators used in electronics.

The first type of generator is based on a random physical phenomenon such as thermal noise in a diode, radioactive emission, etc. It is called a "physical generator" in the description below.

The second type of generator is based on an algorithm fed with a "germ," defined below, which produces as output a random number sequence with a relatively long period. It is called a "pseudo-random generator" in the description below.

A long period associated with a germ of high quality, in terms of random number quality, produces as output from a generator of this type a series of numbers that are practically unpredictable.

Physical generators are of course the only real sources of random numbers since they are completely unpredictable, but many of them are not free from correlations at the output level.

Furthermore, their speed is generally somewhat slow, on the order of several tens of kilobits per second.

Pseudo-random generators are simple to implement in software form and make it possible to supply a high random number output, on the order of several tens of megabits per second.

However, this type of generator corresponds to a deterministic process and is therefore predictable.

The quality of a random generator is difficult to assess because there is no official and standardized procedure that makes it possible to verify the more or less random nature of a series of numbers.

However, there are two series of tests for "validating" a generator of this type.

The first series of tests, called FIPS140 tests, is described in the document FIPS140-1 entitled "Security Requirements for Cryptographic Modules" issued by the American organization NIST. These tests constitute the minimum requirements for any security component wishing to claim the label "FIPS140-compliant," one of the objectives of the present invention.

The second series of tests, developed by George Marsaglia and called DIEHARD tests, are much tougher than the FIPS tests and confer on any generator that passes all of them successfully a certain recognized level of quality.

These two series of tests are included in annexes to the present specification.

SUMMARY OF THE INVENTION

It is the specific object of the invention to eliminate the aforementioned drawbacks and to make it possible to do without a specific physical circuit such as a noise diode, while meeting the dual requirement of high speed, faster than 100 Mbits/s, and a very high quality of random numbers supplied a quality measured by the fact that the generator must successfully pass the above-mentioned FIPS140 and DIEHARD series of tests.

A high-speed random number generator (1) comprising a physical random number generator (5), having a data input, an output and a pseudo-random generator (6) coupled to the output of the physical generator (5), said pseudo random generator having an input adapted to receive a germ delivered by the physical generator and deliver at an output thereof a pseudo-random output signal, said physical generator (5) comprising a logic circuit (10) that includes at least a data input (D) and a clock input (CLK), the data input (D) receiving a first "high frequency" clock signal H1 and the clock input (CLK) receiving a second, "low frequency" clock signal H2, the "high frequency" signal H1 being sampled by the "low frequency" signal H2, the two clock signals H1 and H2 being of different frequencies respectively and issuing from two different first and second oscillators (OSC1 and OSC2) operating asynchronously from one another and not adhering to the setup time of the logic circuit (10), the logic circuit (10) arranged to deliver at an output thereof a signal in an intermediate state qualified as metastable between "0" and "1" and being constituted by a random number sequence, the metastability of the signal obtained as an output from the logic circuit (1.0) being accentuated by phase noise of the first oscillator (OSC1) generating the "high frequency" signal H1, the pseudo-random generator (6) being arranged to re-inject part of the pseudo-random output signal into the physical generator (5). An internal memory (9) stores the random numbers obtained as output signals from the pseudo-random generator (6). The two generators (5) and (6) run on the same second "high frequency" clock signal H generated by an external oscillator (7).

The second subject of the invention is a mechanism for generating random numbers on demand, characterized in that it comprises a random number generator as defined above, a dual-port memory including a receiving buffer, coupled to the output of the generator via the bus of the generator, and in that it includes a microprocessor coupled to the dual-port memory via the microprocessor bus, communicating with the generator via the dual-port memory and posting in the dual-port memory a command word comprising an address and a count containing a maximum number of random words to be stored, and in that the buffer of the dual-port memory, at the request of the microprocessor, is fed by the internal memory of the generator until a count corresponding to a given maximum number of random numbers has elapsed, then utilized by the microprocessor.

Lastly, the third subject of the invention is a card for accelerating the cryptographic functions of a computing machine, characterized in that it supports a random number generator or a mechanism like those defined above.

The invention has the advantage of not using standard electronic circuits to produce the "physical" generator, and hence of reducing the complexity and the cost of such a generator.

BRIEF DESCRIPTION OF THE DRAWINGS

Other advantages and characteristics of the present invention will emerge through the reading of the following description given in reference to the attached figures, which represent.

DESCRIPTION OF THE PREFERRED EMBODIMENT(S)

Figure 1:
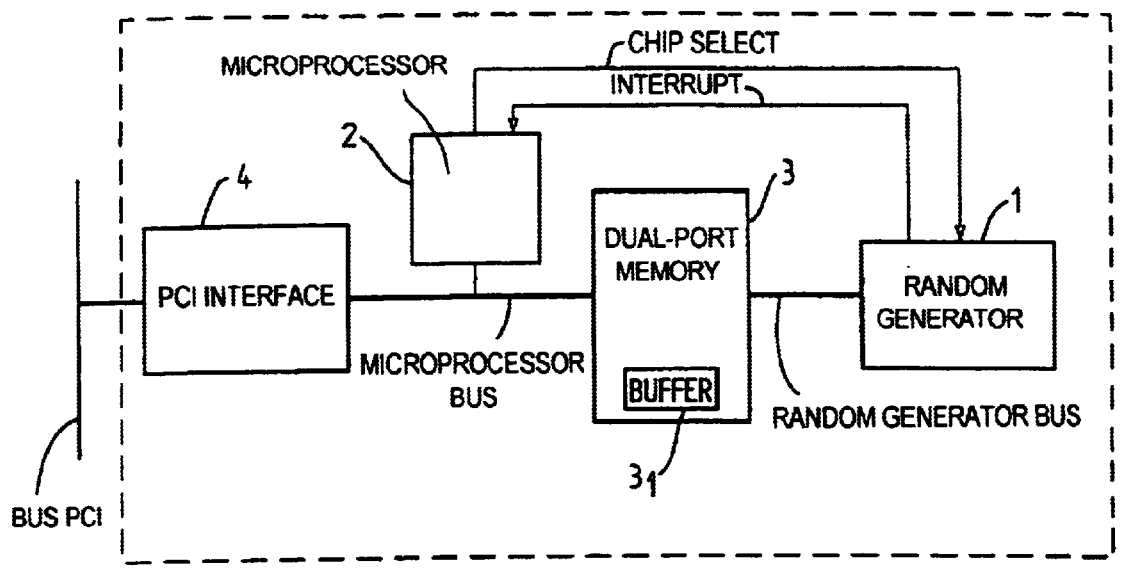
in FIG. 1, the general principle of a mechanism for generating random numbers on demand, into which a random generator according to the invention has been inserted.

The general principle of a random number generating mechanism into which the generator according to the invention has been inserted is illustrated in FIG. 1.

In this figure, the links without arrows are two-way.

The mechanism is delimited in the figure by an enclosing broken line, which could also delimit a PDI card, mentioned above, that supports the mechanism.

The random generator 1 is produced from a programmable logic machine, implemented in a programmable electronic component called FPGA, for "Field Programmable Gate Array," and which, under the control of a microprocessor 2, at the request of the latter, delivers random numbers at a high speed (D>100 Mbits/s).

These random numbers are used by various algorithms, and more particularly by encryption algorithms to generate encryption keys.

A dual-port memory of the DMA (Direct Memory Access) type, is coupled to the output of the random generator 1 via the bus of the generator.

The microprocessor 2 is coupled to the dual-port memory via the microprocessor bus.

It communicates with the generator 1 via the dual-port memory 3, which allows the exchange of data and commands/statuses between the random generator 1 and the PCI bus of the machine to which the card is connected, via a PCI interface 4.

The microprocessor 2 posts in the dual-port memory a command word comprising only an address and a count.

The address points to a receiving buffer $3_1$ of the dual-port memory 3, in which the generator 1 stores the random words.

The count itself sets the number of random words requested from the generator 1, with a maximum capacity, for example 32 Kbytes.

The microprocessor 2 then sends an activating command of the "chip select" type to the generator 1, which reads the command word in the dual-port memory 3 and executes it.

The words generated are then stored in the receiving buffer $3_1$ indicated by the microprocessor 2, until the maximum capacity of the count has elapsed.

The logic machine of the random generator 1 then sends an interrupt command "interrupt" to the microprocessor 2, which tells it that the buffer $3_1$ containing the results is available for reading.

Figure 2:
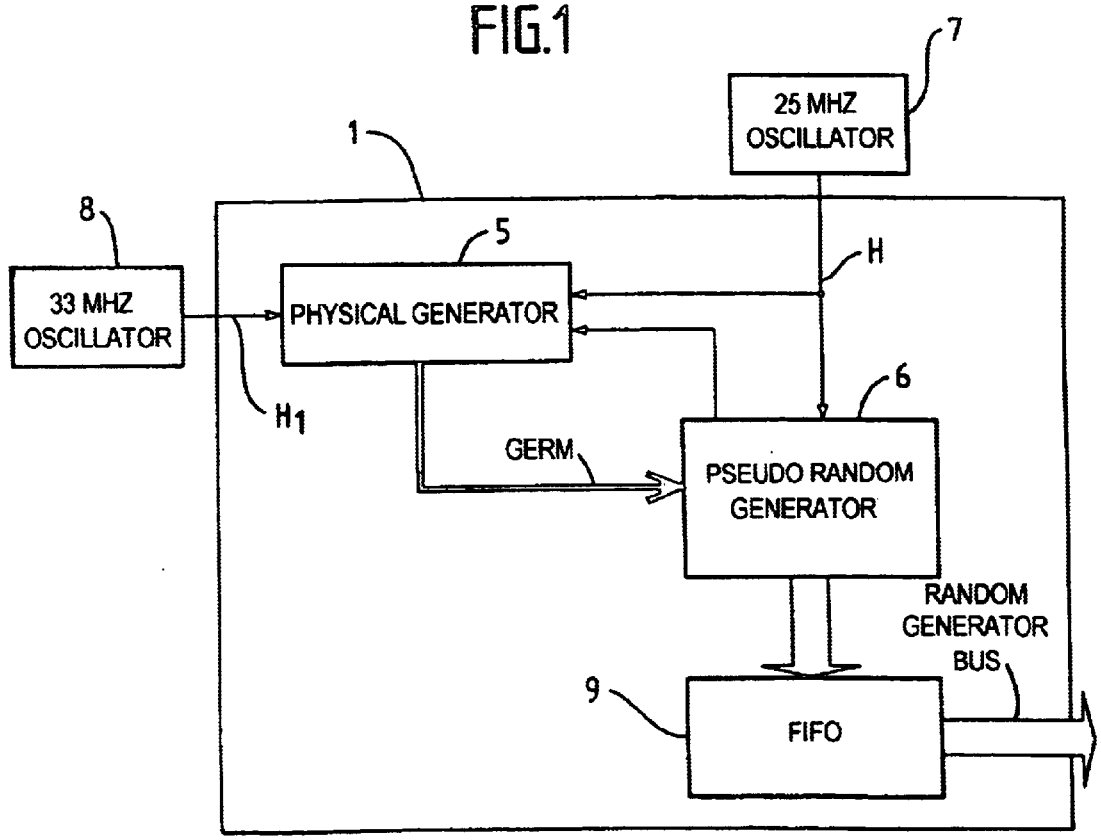
in FIG. 2, the block diagram of a random generator according to the invention.

The block diagram of a random generator according to the invention is illustrated in FIG. 2.

It essentially comprises two stages 5 and 6.

The first stage 5 comprises a "physical" generator and the second stage 6, coupled to the first, comprises a "pseudo-random" generator.

The "physical" generator is a random number generator based on the physical phenomena of metastability and phase noise from oscillators of different frequencies.

The physical generator 5 supplies the pseudo-random generator 6 with a random germ that is high-quality in the sense that it satisfies the FIPS140 tests and also has a speed on the order of 10 Kbits/s/

The "pseudo-random" generator 6, based on the germ received from the physical generator 5, implements an algorithm of the multiply-with-carry type, which has very high speed since it is implemented directly in hardware, and also satisfies both of the series of tests introduced above and described in detail in the annexes.

In the embodiment described, the two generators 5 and 6 run at the rate of an external clock 7 that generates a first "high frequency" clock signal H with a frequency equal to 25 MHz.

An oscillator 8 delivers a second "high frequency" signal H1 with a frequency equal to 33 MHz, which constitutes the input signal of the physical generator 5.

An internal memory 9 of the FIFO ("First In First Out") type is coupled to the output of the pseudo-random generator 6.

The FIFO memory 9 is used to store the random number resulting from the operation performed by the two generators 5 and 6 while waiting for the microprocessor 2 to request their transfer to the dual-port memory 3.

The physical generator according to the invention uses the so-called metastability phenomenon, the principle of which is explained in detail below in reference to FIGS. 3 and 4a through 4c.

When two oscillators OSC1 and OSC2 of different frequencies operate asynchronously from one another, they each generate a separate clock signal, and the signals synchronized with these clock signals belong to separate clock domains that are theoretically independent from the functional point of view. However, there is a moment at which signals are exchanged between the two domains. This situation is a handicap in any design in which it occurs, since it leads to the phenomenon of metastability.

The signals issued by different clock domains do not adhere to the "setup" times of the memory elements (latches or registers) of the other domain, causing the outputs of these elements to have random values.

Figure 3:
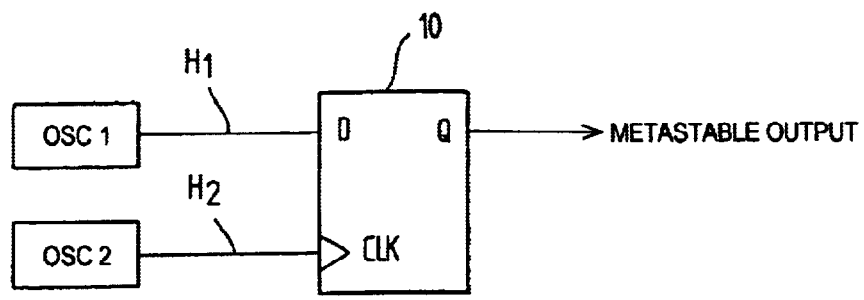
in FIG. 3, a latch that receives through its inputs the respective clock signals generated by two oscillators of different frequencies, and that serves to illustrate the phenomenon of metastability.

FIG. 3 represents a latch that respectively receives in its input D and in its clock input, the clock signals H1 and H2, respectively generated by the oscillators OSC1 and OSC2.

Figure 4A:
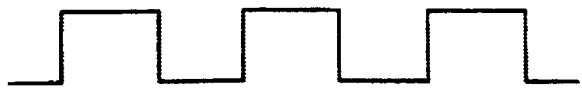
in FIGS. 4a and 4b, the respective timing diagrams of the signals injected into the inputs of the latch of FIG. 3.
Figure 4B:

FIGS. 4a and 4b respectively illustrate exemplary timing diagrams corresponding to the two clock signals.

Figure 4C:
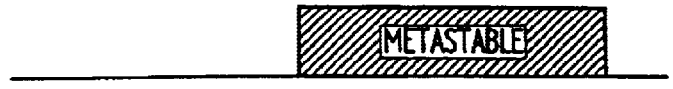
in FIG. 4c, the timing diagram of the signal output from the latch; and in FIG. 5, the block diagram of a physical generator according to the invention.

FIG. 4c illustrates a timing diagram corresponding to the output signal Q of the latch.

The output of a latch whose "setup" has been violated remains in an intermediate state between the "0" state and the "1" state that is qualified as metastable, prior to stabilizing in the final state "0" or "1".

In general, this problem is handled by placing two latches in series, one behind the other, in order to prevent the propagation of this undesirable random event.

On the contrary, this metastability is exploited by the present invention and its occurrence is accentuated by the utilization of two oscillators of very different frequencies.

Preferably, a "high frequency" signal H1 and a "low frequency" signal H2 are thus chosen.

The "high frequency" signal H1 is sampled by the "low frequency" signal H2.

The desired phenomenon is thus accentuated by two physical phenomena:
- the phase noise generated by the "high frequency" oscillator; and
- the forced variability of the period of the "low frequency" oscillator caused by using some of the bits output from the pseudo-random generator in the dividing counter used to generate this frequency. A factor of variable shape is thus obtained.

Figure 5:
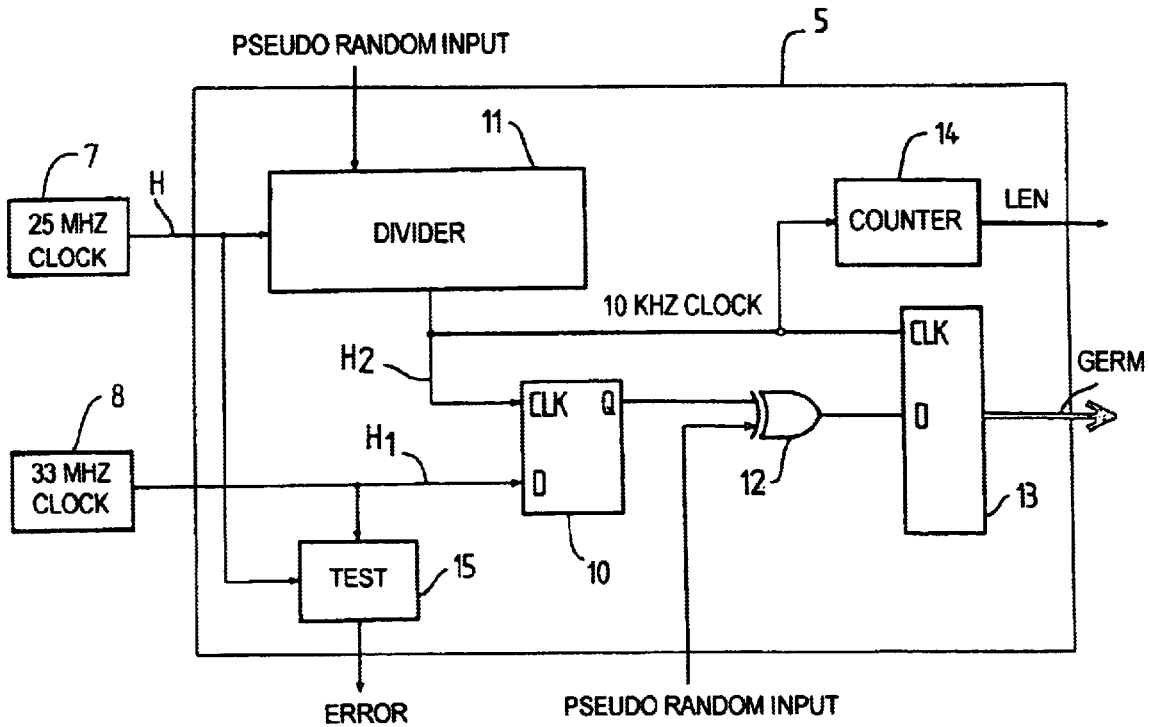

FIG. 5 illustrates the block diagram of a physical generator 5 according to the invention, in which the latch 10, described in reference to FIG. 3 in order to explain metastability, is located.

The input module of the physical generator 5 is a counter 11 that divides by 1312.

It is fed with an external clock signal H having a frequency equal to 25 MHz, and generates as output a "low frequency" clock signal H2 that samples the "high frequency" input clock signal of the generator 5 having a frequency equal to 33 MHz.

The clock signal H2 is injected into the clock input CLK of the latch 10, and the signal H1 is injected into the input D of the latch 10.

The output signal, obtained at the output Q of the latch 10, is combined in an "exclusive OR" logic circuit 12 with a bit output from the pseudo-random generator 6 and sent to the input D of a 64-bit shift register referenced 13.

The logic circuit 12 thus makes it possible to compensate for a possible failure of the physical generator 5.

The shift register 13 reshapes the signal issued by the latch 10.

In the embodiment described, it generates two random 32-bit words every 32×100·s, or about 3.2 ms.

These two words constitute the "germ" used by the pseudo-random generator 6 described below.

In order to specifically meet the constraints of the DIE-HARD series of tests, the renewal of the germ is typically performed every 100 million bits.

Thus, a 3750 counter, 14, generates a LEN (Load Enable) signal, which actually loads a new germ into the pseudo-random generator 6 approximately every 375 ms.

The physical generator 5 also includes a test module 15 comprising two counters and a comparator, not represented.

The two counters respectively receive as input the two clock signals H and H1, respectively of 25 MHz and 33 MHz, and their outputs feed the comparator, and generate an error signal in case of an abnormality (sticking) of the 33 MHz clock signal whose signal is used as the external "high frequency" signal H1.

This test makes it possible to continuously verify that the value of the signal used to generate the random germ is not stuck at "0" or at "1."

In case of sticking, the error signal invalidates the final output of the physical generator 5 by forcing the writing of zeros into the internal memory 9.

The pseudo-random generator 6 is the multiply-with-carry type.

It is particularly suited to the implementation of a generator according to the invention because of the rapidity of execution of its algorithm, but it is not the only one that can be used by the pseudo-random generator.

The algorithm is expressed in the following way:

$X := (A * X(15:0)) + X(31:16);$ $Y := (B * Y(15:0)) + Y(31:16);$ $PRN(31:16) <= X(15:0);$ $PRN(15:0) <= Y(15:0);$ where X and Y are 32-bit variables initialized with the germ described above, A and B are 16-bit constants and PRN corresponds to a 32-bit word delivered as output from the pseudo-random generator 6.

The word PRN is sent to the internal memory 9 of the random generator 1 at the rate of one 32-bit word every 120 ns, or at a global rate of 266 Mbits/s.

The output from the internal memory 9 coupled with the dual port memory 3 feeds the receiving buffer of the dual port memory 3.

The reading of the internal memory 9 takes place at the rate of one 32-bit word every 30 ns, in order not to slow down the internal speed of the random generator 1, even when there is a conflict for access to the dual-port memory 3.

In conclusion, the present invention meets two objectives.

The first objective is to produce a compact hardware implementation of a random number generator that is made entirely from standard components that do not use any specific noise generating components, and that can be supported by a PCI card for accelerating the cryptographic resources of a computing machine.

The second objective, added to the first, is to be able to meet the desired speed and randomness constraints. In this context, a "physical" random-number generator alone is not enough.

That is why the present invention associates a physical generator that exploits the phenomenon of metastability associated with the phenomenon of phase noise in order to guarantee a germ with good random number quality with a pseudo-random generator that accelerates the output of germs delivered by the physical generator and also eliminates any possible correlations on output from the physical generator, which isn't perfect.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

Annexes

Below is a cursory description of the FIPS140 and DIEHARD tests successfully passed by the random generator according to the invention.

1) The FIBS 140 tests:

The FIPS 140 tests are performed on a sequence of 20000 bits and comprise:
- a Monobit test: the member of bits at "1" should be such that: 9654<N<10346
- a so-called POKER test: a test that divides the flow of 20000 bits into 5000 contiguous 4-bit streams. For each stream a function f(i) is evaluated, which is equal to the number of times in which the value 0<i<15 appears.

The following function is then evaluated:

$$X=(16/5000)*(\text{SUM}(f(i)*f(i)))-5000 \text{ with } 0<i<15$$

The test is postive if $1.03<X<57.4$

The Runs test, which counts the number of occurrences of the streams 11 111 1111 00 000 0000 . . .

The test is positive if for each run length the number of results is within the corresponding interval.

| Run length | Required interval |
|---|---|
| 1 | 2267–2733 |
| 2 | 1079–1421 |
| 3 | 502–748 |
| 4 | 223–402 |
| 5 | 90–223 |
| >6 | 90–223 |

The Long Run test, which verifies the absence of a sequence of 34 "1"s or 34 "0"s in the 20000-bit sequence.

For further detail, see FIPS PUB 140-1: SECURITY REQUIREMENTS FOR CRYPTOGRAPHIC MODULES.

1) The DIEHARD Tests:

There are 15 of these tests and all of them are described in this annex. A file containing 80 random Mbits is required in order to pass the tests, and the results are given in the form of numbers $0<p<1$.

The result of the tests depends on the number of values $p=1$ or $p=0$ found:

No value $p=1$ or $p=0$• the result of the tests is positive.

Some values $p=1$ or $p=0$• the result of the tests is positive but the random numbers are of average quality.

The number of consecutive values $p=1$ or $p=0$ is $>5$ in one or more tests • the result of the tests is negative.

```
::::::::::::::::::::::::::::::::::::::::::::::::::::::::::
::         This is the BIRTHDAY SPACING TEST           ::
:: Choose m birthdays in a year of n days. List the spacings  ::
:: between the birthdays. If j is the number of values that   ::
:: occur more than once in that list, then j is asymptotically ::
:: Pisces distributed with mean m^3/(4n). Experience shows n  ::
:: must be quite large, say n>=2^18, for comparing the results ::
:: to the Pisces distribution with that mean. This test uses  ::
:: n=2^24 and m=2^9, so that the underlying distribution for j ::
:: is taken to be Pisces with lambda=2^27/(2^26)=2. A sample  ::
:: of 500 j's is taken, and a chi-square goodness of fit test ::
:: provides a p value. The first test uses bits 1–24 (counting ::
:: from the left) from integers in the specified file.       ::
::   Then the file is closed and reopened. Next, bits 2–25 are ::
:: used to provide birthdays, then 3–26 and so on to bits 9–32. ::
:: Each set of bits provides a p-value, and the nine p-values ::
:: provide a sample for a KSTEST.                           ::
::::::::::::::::::::::::::::::::::::::::::::::::::::::::::
::::::::::::::::::::::::::::::::::::::::::::::::::::::::::
::         THE OVERLAPPING 5-PERMUTATION TEST          ::
:: This is the OPERM5 test. It looks at a sequence of one mill-::
:: ion 32-bit random integers. Each set of five consecutive   ::
:: integers can be in one of 120 states, for the 5! possible or-::
:: derings of five numbers. Thus the 5th, 6th, 7th, ...numbers ::
:: each provide a state. As many thousands of state transitions ::
:: are observed, cumulative counts are made of the number of   ::
:: occurrences of each state. Then the quadratic form in the   ::
:: weak inverse of the 120×120 covariance matrix yields a test ::
:: equivalent to the likelihood ratio test that the 120 cell   ::
:: counts came from the specified (asymptotically) normal dis- ::
:: tribution with the specified 120×120 covariance matrix (with ::
:: rank 99). This version uses 1,000,000 integers, twice.    ::
::::::::::::::::::::::::::::::::::::::::::::::::::::::::::
```

```
::::::::::::::::::::::::::::::::::::::::::::::::::::::::::
:: This is the BINARY RANK TEST for 31×31 matrices. The leftmost ::
:: 31 bits of 31 random integers from the test sequence are used ::
:: to form a 31×31 binary matrix over the field {0,1}. The rank ::
:: is determined. That rank can be from 0 to 31, but ranks<28  ::
:: are rare, and their counts are pooled with those for rank 28.::
:: Ranks are found for 40,000 such random matrices and a chisqua-::
:: re test is performed on counts for ranks 31,30,29 and <=28. ::
::::::::::::::::::::::::::::::::::::::::::::::::::::::::::
::::::::::::::::::::::::::::::::::::::::::::::::::::::::::
:: This is the BINARY RANK TEST for 32×32 matrices. A random 32× ::
:: 32 binary matrix is formed, each row a 32-bit random integer. ::
:: The rank is determined. That rank can be from 0 to 32, ranks ::
:: less than 29 are rare, and their counts are pooled with those ::
:: for rank 29. Ranks are found for 40,000 such random matrices ::
:: and a chisquare test is performed on counts for ranks 32,31, ::
:: 30 and <=29.                                           ::
::::::::::::::::::::::::::::::::::::::::::::::::::::::::::
:: This is the BINARY RANK TEST for 6×8 matrices. From each of ::
:: six random 32-bit integers from the generator under test, a ::
:: specified byte is chosen, and the resulting six bytes form a ::
:: 6×8 binary matrix whose rank is determined. That rank can be ::
:: from 0 to 6, but ranks 0,1,2,3 are rare; their counts are   ::
:: pooled with those for rank 4. Ranks are found for 100,000  ::
:: random matrices, and a chi-square test is performed on     ::
:: counts for ranks 6,5 and <=4.                            ::
::::::::::::::::::::::::::::::::::::::::::::::::::::::::::
:: THE BITSTREAM TEST ::
:: The file under test is viewed as a stream of bits. Call them ::
:: b1,b2,... . Consider an alphabet with two "letters", 0 and 1 ::
:: and think of the stream of bits as a succession of 20-letter ::
:: "words", overlapping. Thus the first word is b1b2...b20, the ::
:: second is b2b3...b21, and so on. The bitstream test counts  ::
:: the number of missing 20-letter (20-bit) words in a string of ::
:: 2^21 overlapping 20-letter words. There are 2^20 possible 20 ::
:: letter words. For a truly random string of 2^21+19 bits, the ::
:: number of missing words j should be (very close to) normally ::
:: distributed with mean 141,909 and sigma 428. Thus          ::
:: (j-141909)/428 should be a standard normal variate (z score) ::
:: that leads to a uniform [0,1) p value. The test is repeated ::
:: twenty times.                                          ::
::::::::::::::::::::::::::::::::::::::::::::::::::::::::::
::         The tests OPSO, OQSO and DNA                 ::
::         OPSO means Overlapping-Pairs-Sparse-Occupancy ::
:: The OPSO test considers 2-letter words from an alphabet of  ::
:: 1024 letters. Each letter is determined by a specified ten  ::
:: bits from a 32-bit integer in the sequence to be tested. OPSO ::
:: generates 2^21 (overlapping) 2-letter words (from 2^21+1   ::
:: "keystrokes") and counts the number of missing words---that ::
:: is 2-letter words which do not appear in the entire sequence. ::
:: That count should be very close to normally distributed with ::
:: mean 141,909, sigma 290. Thus (missingwrds-141909)/290 should ::
:: be a standard normal variable. The OPSO test takes 32 bits at ::
:: a time from the test file and uses a designated set of ten  ::
:: consecutive bits. It then restarts the file for the next de- ::
:: signated 10 bits, and so on.                             ::
::::::::::::::::::::::::::::::::::::::::::::::::::::::::::
:: OQSO means Overlapping-Quadruples-Sparse-Occupancy       ::
:: The test OQSO is similar, except that it considers 4-letter ::
:: words from an alphabet of 32 letters, each letter determined ::
:: by a designated string of 5 consecutive bits from the test ::
:: file, elements of which are assumed 32-bit random integers. ::
:: The mean number of missing words in a sequence of 2^21 four- ::
:: letter words, (2^21+3 "keystrokes"), is again 141909, with ::
:: sigma = 295. The mean is based on theory; sigma comes from ::
::extensive simulation.                                    ::
:: The DNA test considers an alphabet of 4 letters:: C,G,A,T,::
:: determined by two designated bits in the sequence of random ::
:: integers being tested. It considers 10-letter words, so that::
:: as in OPSO and OQSO, there are 2^20 possible words, and the ::
:: mean number of missing words from a string of 2^21 (over-  ::
:: lapping) 10-letter words (2^21+9 "keystrokes") is 141909. ::
:: The standard deviation sigma=339 was determined as for OQSO ::
:: by simulation. (Sigma for OPSO, 290, is the true value (to ::
:: three places), not determined by simulation.             ::
::::::::::::::::::::::::::::::::::::::::::::::::::::::::::
```

-continued

```
::::::::::::::::::::::::::::::::::::::::::::::::::::::
::   This is the COUNT-THE-1's TEST on a stream of bytes.     ::
:: Consider the file under test as a stream of bytes (four per ::
:: 32 bit integer). Each byte can contain from 0 to 8 1's,    ::
:: with probabilities 1,8,28,56,70,56,28,8,1 over 256. Now let ::
:: the stream of bytes provide a string of overlapping 5-letter ::
:: words, each "letter" taking values A,B,C,D,E. The letters are ::
:: determined by the number of 1's in a byte:: 0,1,or 2 yield A, ::
:: 3 yields B, 4 yields C, 5 yields D and 6,7 or 8 yield E. Thus ::
:: we have a monkey at a typewriter hitting five keys with vari- ::
:: ous probabilities (37,56,70,56,37 over 256). There are 5^5 ::
:: possible 5-letter words, and from a string of 256,000 (over- ::
:: lapping) 5-letter words, counts are made on the frequencies ::
:: for each word. The quadratic form in the weak inverse of  ::
:: the covariance matrix of the cell counts provides a chisquare ::
:: test:: Q5-Q4, the difference of the naive Pearson sums of ::
:: (OBS-EXP)^2/EXP on counts for 5- and 4-letter cell counts. ::
::::::::::::::::::::::::::::::::::::::::::::::::::::::
::     This is the COUNT-THE-1's TEST for specific bytes.    ::
:: Consider the file under test as a stream of 32-bit integers. ::
:: From each integer, a specific byte is chosen, say the left- ::
:: most:: bits 1 to 8. Each byte can contain from 0 to 8 1's, ::
:: with probability 1,8,28,56,70,56,28,8,1 over 256. Now let ::
:: the specified bytes from successive integers provide a string ::
:: of (overlapping) 5-letter words, each "letter" taking values ::
:: A,B,C,D,E. The letters are determined by the number of 1's, ::
:: in that byte:: 0,1,or 2 --->A, 3 --->B, 4 --->C, 5 --->D, ::
:: and 6,7 or 8 --->E. Thus we have a monkey at a typewriter ::
:: hitting five keys with various probabilities:: 37,56,70, ::
:: 56,37 over 256. There are 5^5 possible 5-letter words, and ::
:: from a string of 256,000 (overlapping) 5-letter words, counts ::
:: are made on the frequencies for each word. The quadratic form ::
:: in the weak inverse of the covariance matrix of the cell ::
:: counts provides a chisquare test:: Q5-Q4, the difference of ::
:: the naive Pearson sums of (OBS-EXP)^2/EXP on counts for 5- ::
:: and 4-letter cell counts.   ::
::::::::::::::::::::::::::::::::::::::::::::::::::::::
::            THIS IS A PARKING LOT TEST                  ::
:: In a square of side 100, randomly "park" a car---a circle of ::
:: radius 1. Then try to park a 2nd, a 3rd, and so on, each ::
:: time parking "by ear". That is, if an attempt to park a car ::
:: causes a crash with one already parked, try again at a new ::
:: random location. (To avoid path problems, consider parking ::
:: helicopters rather than cars.) Each attempt leads to either ::
:: a crash or a success, the latter followed by an increment to ::
:: the list of cars already parked. If we plot n: the number of ::
:: attempts, versus k:: the number successfully parked, we get a:: ::
:: curve that should be similar to those provided by a perfect ::
:: random number generator. Theory for the behavior of such a ::
:: random curve seems beyond reach, and as graphics displays are ::
:: not available for this battery of tests, a simple characteriz ::
:: ation of the random experiment is used: k, the number of cars ::
:: successfully parked after n=12,000 attempts. Simulation shows ::
:: that k should average 3523 with sigma 21.9 and is very close ::
:: to normally distributed. Thus (k-3523)/21.9 should be a st- ::
:: andard normal variable, which, converted to a uniform varia- ::
:: ble, provides input to a KSTEST based on a sample of 10. ::
::::::::::::::::::::::::::::::::::::::::::::::::::::::
::           THE MINIMUM DISTANCE TEST                    ::
:: It does this 100 times:: choose n=8000 random points in a ::
:: square of side 10000. Find d, the minimum distance between ::
:: the (n^2-n)/2 pairs of points. If the points are truly inde- ::
:: pendent uniform, then d^2, the square of the minimum distance ::
:: should be (very close to) exponentially distributed with mean ::
:: .995. Thus 1-exp(-d^2/.995) should be uniform on [0,1) and ::
:: a KSTEST on the resulting 100 values serves as a test of uni- ::
:: formity for random points in the square. Test numbers=0 mod 5 ::
:: are printed but the KSTEST is based on the full set of 100 ::
:: random choices of 8000 points in the 10000x10000 square. ::
::::::::::::::::::::::::::::::::::::::::::::::::::::::
::              THE 3DSPHERES TEST                        ::
:: Choose 4000 random points in a cube of edge 1000. At each ::
:: point, center a sphere large enough to reach the next closest ::
:: point. Then the volume of the smallest such sphere is (very ::
:: close to) exponentially distributed with mean 120pi/3. Thus ::
```

```
:: the radius cubed is exponential with mean 30. (The mean is ::
:: obtained by extensive simulation). The 3DSPHERES test gener- ::
:: ates 4000 such spheres 20 times. Each min radius cubed leads ::
:: to a uniform variable by means of 1-exp(-r^3/30.), then a ::
:: KSTEST is done on the 20 p-values.   ::
::::::::::::::::::::::::::::::::::::::::::::::::::::::
::          This is the SQEEZE test               ::
:: Random integers are floated to get uniforms on [0,1). Start- ::
:: ing with k=2^31=2147483647, the test finds j, the number of ::
:: iterations necessary to reduce k to 1, using the reduction ::
:: k=ceiling(k*U), with U provided by floating integers from ::
:: the file being tested. Such j's are found 100,000 times, ::
:: then counts for the number of times j was <=6,7,...,47,>=48 ::
:: are used to provide a chi-square test for cell frequencies. ::
::::::::::::::::::::::::::::::::::::::::::::::::::::::
::          The OVERLAPPING SUMS test              ::
:: Integers are floated to get a sequence U(1),U(2),... of uni- ::
:: form [0,1) variables. Then overlapping sums, ::
:: S(1)=U(1)+...+U(100), S2=U(2)+...+U(101),... are formed. ::
:: The S's are virtually normal with a certain covariance mat- ::
:: rix. A linear transformation of the S's converts them to a ::
:: sequence of independent standard normals, which are converted ::
:: to uniform variables for a KSTEST. The p-values from ten ::
:: KSTESTs are given still another KSTEST. ::
::::::::::::::::::::::::::::::::::::::::::::::::::::::
::     This is the RUNS test. It counts runs up, and runs down, ::
:: in a sequence of uniform [0,1) variables, obtained by float- ::
:: ing the 32-bit integers in the specified file. This example ::
:: shows how runs are counted: .123,.357,.789,.425,.224,.416,.95:: ::
:: contains an up-run of length 3, a down-run of length 2 and an ::
:: up-run of (at least) 2, depending on the next values. The ::
:: covariance matrices for the runs-up and runs-down are well ::
:: known, leading to chisquare tests for quadratic forms in the ::
:: weak inverses of the covariance matrices. Runs are counted ::
:: for sequences of length 10,000. This is done ten times. Then ::
:: repeated.   ::
::::::::::::::::::::::::::::::::::::::::::::::::::::::
:: This is the CRAPS TEST. It plays 200,000 games of craps, finds:: ::
:: the number of wins and the number of throws necessary to end ::
:: each game. The number of wins should be (very close to) a ::
:: normal with mean 200000p and variance 200000p(1-p), with ::
:: p=244/495. Throws necessary to complete the game can vary ::
:: from 1 to infinity, but counts for all>21 are lumped with 21. ::
:: A chi-square test is made on the no.-of-throws cell counts. ::
:: Each 32-bit integer from the test file provides the value for:: ::
:: the throw of a die, by floating to [0,1), multiplying by 6 ::
:: and taking 1 plus the integer part of the result. ::
::::::::::::::::::::::::::::::::::::::::::::::::::::::
NOTE: Most of the tests in DIEHARD return a p-value, which
should be uniform on [0,1) if the input file contains truly
independent random bits. Those p-values are obtained by
p=F(X), where F is the assumed distribution of the sample
random variable X---often normal. But that assumed F is just
an asymptotic approximation, for which the fit will be worst
in the tails. Thus you should not be surprised with
occasional p-values near 0 or 1, such as .0012 or .9983.
When a bit stream really FAILS BIG, you will get p's of 0 or
1 to six or more places. By all means, do not, as a
Statistician might, think that a p < .025 or p> .975 means
that the RNG has "failed the test at the .05 level". Such
p's happen among the hundreds that DIEHARD produces, even
with good RNG's. So keep in mind that "p happens".
```

What is claimed is:

1. High-speed random number generator (1) comprising a physical random number generator (5), having a data input and an output, and a pseudo-random generator (6) coupled to the output of the physical random generator (5), said pseudo-random generator having an input adapted to receive a germ delivered by the physical generator and an output from which is delivered a pseudo-random output signal, said physical generator (5) comprising a logic circuit (10) having a set up time and at least a data input (D) and a clock input (CLK), the data input (D) adapted to receive a first "high frequency" clock signal H1 and the clock input (CLK) adapted to receive a second "low frequency" clock signal H2, the "high frequency" signal H1 adapted to be sampled by the "low frequency" signal H2, the two clock signals H1 and H2 being of different frequencies, respectively, and issuing from two different first (OSC1) and second (OSC2) oscillators operating asynchronously from one another and not adhering to the setup time of the logic circuit (10), the logic circuit (10) arranged to deliver at an output thereof a signal in an intermediate state qualified as metastable between "0" and "1" and being constituted by a random number sequence, the metastability of the signal obtained as an output from the logic circuit (10) being accentuated by phase noise of the first oscillator (OSC1) generating the "high frequency" signal H1, the pseudo-random generator (6) being arranged to re-inject part of the pseudo-random output signal into the physical generator (5) and an internal memory (9) for storing random numbers obtained as output signals from the pseudo-random generator (6) and an external oscillator having a "high frequency" clock signal output (H), the physical random number generator (5) and the pseudo-random number generator (6) running on the same second "high frequency" clock signal H generated by the external oscillator (7).

2. A random number generator according to claim 1, characterized in that the physical generator (5) includes a counter (11) which, from the "high frequency" clock signal H generated by the external oscillator (7), generates the "low frequency" clock signal H2, which samples the input signal of the physical generator (5).

3. A random number generator according to claim 2, characterized in that part of the signal output from the pseudo-random generator is re-injected into the counter (11) that generates the "low frequency" signal, in order to force the variability of the period of the "low frequency" signal.

4. A random number generator according to claim 3, characterized in that the physical generator (5) includes a shift register (13) having a data input arranged to receive a signal output from the latch-type logic circuit (10), and a clock input (CLK) arranged to receive the "low frequency" signal H2 generated by the counter (11), the shift register (13) delivering through its output the germ that feeds the pseudo-random generator (6).

5. A random number generator according to claim 4, characterized in that the physical generator (5) also includes an "exclusive OR" logic gate (12), coupled between the latch-type logic circuit (10) and the shift register (13), and receiving in a first input the signal output from the logic circuit (10), and in a second input a bit of the signal output from the pseudo-random generator (6), in order to compensate for a possible failure of the physical generator (5).

6. A random number generator according to claim 5, characterized in that the physical generator (5) includes a counter (14) that receives in its input the "low frequency" clock signal H2, and whose output signal controls the renewal rate of the germ in the pseudo-random generator (6).

7. A random number generator according to claim 6, characterized in that it also includes a test module (15) coupled to the input of the physical generator (5) that receives the "high frequency" signals H and H1 as an output and delivers as an output an error signal upon malfunction of the first oscillator delivering the "high frequency" signal H1, to invalidate the output of the physical generator (5) by forcing the writing of zeros into an internal memory (9).

8. A random number generator according to claim 5, characterized in that it also includes a test module (15) coupled to the input of the physical generator (5) that receives the "high frequency" signals H and H1 as an output and delivers as an output an error signal upon malfunction of the first oscillator delivering the "high frequency" signal H1, to invalidate the output of the physical generator (5) by forcing the writing of zeros into an internal memory (9).

9. A random number generator according to claim 4, characterized in that it also includes a test module (15) coupled to the input of the physical generator (5) that receives the "high frequency" signals H and H1 as an output and delivers as an output an error signal upon malfunction of the first oscillator delivering the "high frequency" signal H1, to invalidate the output of the physical generator (5) by forcing the writing of zeros into an internal memory (9).

10. A random number generator according to claim 3, characterized in that it also includes a test module (15) coupled to the input of the physical generator (5) that receives the "high frequency" signals H and H1 as an output and delivers as an output an error signal upon malfunction of the first oscillator delivering the "high frequency" signal H1, to invalidate the output of the physical generator (5) by forcing the writing of zeros into an internal memory (9).

11. A random number generator according to claim 2, characterized in that it also includes a test module (15) coupled to the input of the physical generator (5) that receives the "high frequency" signals H and H1 as an output and delivers as an output an error signal upon malfunction of the first oscillator delivering the "high frequency" signal H1, to invalidate the output of the physical generator (5) by forcing the writing of zeros into an internal memory (9).

12. A random number generator according to claim 2, characterized in that it comprises in its entirety an FPGA component.

13. A random number generator according to claim 1, characterized in that it also includes a test module (15) coupled to the input of the physical generator (5) that receives the "high frequency" signals H and H1 as an output and delivers as an output an error signal upon malfunction of the first oscillator delivering the "high frequency" signal H1, to invalidate the output of the physical generator (5) by forcing the writing of zeros into an internal memory (9).

14. A random number generator according to claim 1, characterized in that the pseudo-random generator (6) implements an algorithm of the multiply-with-carry type.

15. A mechanism for generating random numbers on demand, having a physical random number generator (5), having a data input and an output, and a pseudo-random generator (6) coupled to the output of the physical random generator (5), said pseudo-random generator having an input adapted to receive a germ delivered by the physical generator and an output from which is delivered a pseudo-random output signal, said physical generator (5) comprising a logic circuit (10) having a set up time and at least a data input (D) and a clock input (CLK), the data input (D) adapted to receive a first "high frequency" clock signal H1 and the clock input (CLK) adapted to receive a second "low frequency" clock signal H2, the "high frequency" signal H1 adapted to be sampled by the "low frequency" signal H2, the two clock signals H1 and H2 being of different frequencies respectively and issuing from two different first (OSC1) and second (OSC2) oscillators operating asynchronously from one another and not adhering to the setup time of the logic circuit (10), the logic circuit (10) arranged to deliver at an output thereof a signal in an intermediate state qualified as metastable between "0" and "1" and being constituted by a random number sequence, the metastability of the signal obtained as an output from the logic circuit (1.0) being accentuated by phase noise of the first oscillator (OSC1) generating the "high frequency" signal H1, the pseudo-random generator (6) being arranged to re-inject part of the pseudo-random output signal into the physical generator (5) and an internal memory (9) for storing random numbers obtained as output signals from the pseudo-random generator (6) and an external oscillator having a "high frequency" clock signal output (H), the physical random number generator (5) and the pseudo-random number generator (6) running on the same second "high frequency" clock signal H generated by the external oscillator (7), comprising a random number generator (1) and further including a dual-port memory (3) including a receiving buffer ($3_1$), coupled to the output of the generator (1) via a bus, and a microprocessor (2) coupled to the dual-port memory (3) via a microprocessor bus, communicating with the generator (1) via the dual-port memory (3) and posting in the dual-port memory (3) a command word comprising an address and a count containing a maximum number of random words to be stored, and the receiving buffer ($3_1$) of the dual-port memory (3), at the request of the microprocessor (2), arranged to be fed by the internal memory (9) of the generator (1) until a count corresponding to a given maximum number of random numbers has elapsed, then utilized by the microprocessor (2).

16. A mechanism according to claim 15, characterized in that the physical generator (5) includes a block (11) which, from the "high frequency" clock signal H generated by the external oscillator (7), generates the "low frequency" clock signal H2, which samples the input signal of the physical generator (5).

17. A mechanism according to claim 15, characterized in that part of the signal output from the pseudo-random generator is re-injected into the counter (11) that generates the "low frequency" signal, in order to force the variability of the period of the "low frequency" signal.

18. A mechanism according to claim 15, characterized in that the physical generator (5) includes a shift register (13) having a data input arranged to receive a signal output from the latch-type logic circuit (10), and a clock input (CLK) arranged to receive the "low frequency" signal H2 generated by the counter (11), the shift register (13) delivering through its output the germ that feeds the pseudo-random generator (6).

19. A mechanism according to claim 15, characterized in that the physical generator (5) also includes an "exclusive OR" logic gate (12), coupled between the latch-type logic circuit (10) and the shift register (13), and receiving in a first input the signal output from the logic circuit (10), and in a second input a bit of the signal output from the pseudo-random generator (6), in order to compensate for a possible failure of the physical generator (5).

20. A mechanism according to claim 15, characterized in that the physical generator (5) includes a counter (14) that receives in its input the "low frequency" clock signal H2, and whose output signal controls the renewal rate of the germ in the pseudo-random generator (6).

21. A card for accelerating the cryptographic functions of a computing machine, characterized in that it supports a random number generator (1) comprising a physical random number generator (5), having a data input and an output, and a pseudo-random generator (6) coupled to the output of the physical generator (5), said pseudo-random generator having an input adapted to receive a germ delivered by the physical generator and an output from which is delivered a pseudo-random output signal, said physical generator (5) comprising a logic circuit (10) having a set up time and at least a data input (D) and a clock input (CLK), the data input (D) adapted to receive a first "high frequency" clock signal H1 and the clock input (CLK) adapted to receive a second "low frequency" clock signal H2, the "high frequency" signal H1 adapted to be sampled by the "low frequency" signal H2, the two clock signals H1 and H2 being of different frequencies, respectively, and issuing from two different first (OSC1) and second (OSC2) oscillators operating asynchronously from one another and not adhering to the setup time of the logic circuit (10), the logic circuit (10) arranged to deliver at an output thereof a signal in an intermediate state qualified as metastable between "0" and "1" and being constituted by a random number sequence, the metastability of the signal obtained as an output from the logic circuit (1.0) being accentuated by phase noise of the first oscillator (OSC1) generating the "high frequency" signal H1, the pseudo-random generator (6) being arranged to re-inject part of the pseudo-random output signal into the physical generator (5) and an internal memory (9) for storing random numbers obtained as output signals from the pseudo-random generator (6) and an external oscillator having a "high frequency" clock signal output (H), the physical random number generator (5) and the pseudo-random number generator (6) running on the same second "high frequency" clock signal H generated by the external oscillator (7).

22. A card according to claim 21, characterized in that the physical generator (5) includes a counter (11) which, from the "high frequency" clock signal H generated by the external oscillator (7), generates the "low frequency" clock signal H2, which samples the input signal of the physical generator (5).

23. A card according to claim 21, characterized in that part of the signal output from the pseudo-random generator is re-injected into the counter (11) that generates the "low frequency" signal, in order to force the variability of the period of the "low frequency" signal.

24. A card according to claim 21, characterized in that the physical generator (5) includes a shift register (13) having a data input arranged to receive a signal output from the latch-type logic circuit (10), and a clock input (CLK) arranged to receive the "low frequency" signal H2 generated by the block (11), the shift register (13) delivering through its output the germ that feeds the pseudo-random generator (6).

25. A card according to claim 21, characterized in that the physical generator (5) also includes an "exclusive OR" logic gate (12), coupled between the latch-type logic circuit (10) and the shift register (13), and receiving in a first input the signal output from the logic circuit (10), and in a second input a bit of the signal output from the pseudo-random generator (6), in order to compensate for a possible failure of the physical generator (5).

26. A card according to claim 21, characterized in that the physical generator (5) includes a counter (14) that receives in its input the "low frequency" clock signal H2, and whose output signal controls the renewal rate of the germ in the pseudo-random generator (6).

27. A card for accelerating the cryptographic functions of a computing machine, characterized in that it supports a mechanism for generating random numbers on demand, having a physical random number generator (5), having a data input and an output, and a pseudo-random generator (6) coupled to the output of the physical random generator (5), said pseudo-random generator having an input adapted to receive a germ delivered by the physical generator and an output from which is delivered a pseudo-random output signal, said physical generator (5) comprising a logic circuit (10) having a set up time and at least a data input (D) and a clock input (CLK), the data input (D) adapted to receive a first "high frequency" clock signal H1 and the clock input (CLK) adapted to receive a second "low frequency" clock signal H2, the "high frequency" signal H1 adapted to be sampled by the "low frequency" signal H2, the two clock signals H1 and H2 being of different frequencies, respectively, and issuing from two different first (OSC1) and second (OSC2) oscillators operating asynchronously from one another and not adhering to the setup time of the logic circuit (10), the logic circuit (10) arranged to deliver at an output thereof a signal in an intermediate state qualified as metastable between "0" and "1" and being constituted by a random number sequence, the metastability of the signal obtained as an output from the logic circuit (1.0) being accentuated by phase noise of the first oscillator (OSC1) generating the "high frequency" signal H1, the pseudo-random generator (6) being arranged to re-inject part of the pseudo-random output signal into the physical generator (5) and an internal memory (9) for storing random numbers obtained as output signals from the pseudo-random generator (6) and an external oscillator having a "high frequency" clock signal output (H), the physical random number generator (5) and the pseudo-random number generator (6) running on the same second "high frequency" clock signal H generated by the external oscillator (7), comprising a random number generator (1) and further including a dual-port memory (3) including a receiving buffer ($3_1$), coupled to the output of the generator (1) via a bus, and a microprocessor (2) coupled to the dual-port memory (3) via a microprocessor bus, communicating with the generator (1) via the dual-port memory (3) and posting in the dual-port memory (3) a command word comprising an address and a count containing a maximum number of random words to be stored, and the receiving buffer ($3_1$) of the dual-port memory (3), at the request of the microprocessor (2), arranged to be fed by the internal memory (9) of the generator (1) until a count corresponding to a given maximum number of random numbers has elapsed, then utilized by the microprocessor (2).

28. A card according to claim 27, characterized in that the physical generator (5) includes a counter (11) which, from the "high frequency" clock signal H generated by the external oscillator (7), generates the "low frequency" clock signal H2, which samples the input signal of the physical generator (5).

29. A card according to claim 27, characterized in that part of the signal output from the pseudo-random generator is re-injected into the counter (11) that generates the "low frequency" signal, in order to force the variability of the period of the "low frequency" signal.

30. A card according to claim 27, characterized in that the physical generator (5) includes a shift register (13) having a data input arranged to receive a signal output from the latch-type logic circuit (10), and a clock input (CLK) arranged to receive the "low frequency" signal H2 generated by the block (11), the shift register (13) delivering through its output the germ that feeds the pseudo-random generator (6).

31. A card according to claim 27, characterized in that the physical generator (5) also includes an "exclusive OR" logic gate (12), coupled between the latch-type logic circuit (10) and the shift register (13), and receiving in a first input the signal output from the logic circuit (10), and in a second input a bit of the signal output from the pseudo-random generator (6), in order to compensate for a possible failure of the physical generator (5).

32. A card according to claim 27, characterized in that the physical generator (5) includes a counter (14) that receives in its input the "low frequency" clock signal H2, and whose output signal controls the renewal rate of the germ in the pseudo-random generator (6).

* * * * *